(12) United States Patent
Nautiyal et al.

(10) Patent No.: US 9,351,136 B1
(45) Date of Patent: May 24, 2016

(54) COMMUNICATION PATH SETTINGS FOR WIRELESS MESSAGING BASED ON QUALITY OF SERVICE

(71) Applicant: Sprint Communications Company L.P., Overland Park, KS (US)

(72) Inventors: Rajesh Kumar Nautiyal, Olathe, KS (US); Rajil Malhotra, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/839,518

(22) Filed: Aug. 28, 2015

(51) Int. Cl.
*H04W 4/12* (2009.01)
*H04W 4/14* (2009.01)
*H04W 28/16* (2009.01)

(52) U.S. Cl.
CPC ............... *H04W 4/14* (2013.01); *H04W 28/16* (2013.01)

(58) Field of Classification Search
CPC ....... H04L 63/10; H04L 63/102; H04L 63/06; H04L 63/062; H04L 63/00; H04L 63/18; H04L 65/90; H04L 65/00; H04L 65/1066; H04L 65/1003; H04L 67/322; H04L 67/32; H04L 67/325; H04L 67/327; H04W 4/185; H04W 4/20; H04W 4/18; H04W 4/12; H04W 4/16; H04W 48/18

USPC ......................................................... 455/466
See application file for complete search history.

(56) References Cited

U.S. PATENT DOCUMENTS

| | | | |
|---|---|---|---|
| 2010/0202345 A1* | 8/2010 | Jing | H04L 12/2832 370/328 |
| 2013/0250811 A1* | 9/2013 | Vasseur | H04W 40/023 370/255 |
| 2014/0173088 A1* | 6/2014 | Varney | H04L 67/42 709/224 |
| 2014/0206403 A1 | 7/2014 | Buckley et al. | |

* cited by examiner

*Primary Examiner* — Siu Lee (57) ABSTRACT

Examples disclosed herein provide systems, methods, and software to manage communication path settings for wireless messages based on quality of service. In one implementation, a messaging system on a first network for a wireless device may identify a message for a second wireless device. In response to the message, the messaging system queries a profile server for addressing information for the second device and quality of service information related to the communication path. Based on the information retrieved from the profile server, the messaging system determines a reply communication path for future messages and a time to live value that the reply path is valid. The messaging system then transfers the communication to the second wireless device with the reply communication path and the time to live information.

20 Claims, 7 Drawing Sheets

FIGURE 7

COMMUNICATION PATH SETTINGS FOR WIRELESS MESSAGING BASED ON QUALITY OF SERVICE

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some communication system implementations, to exchange text or short message service (SMS) messages between devices, home subscriber servers or other similar profile servers may be required to address communications between devices. In particular, in response to identifying a message from a first wireless device to a second wireless device, a messaging system associated with the first device may query a profile server to determine addressing information for the second wireless device. Similarly, when the second wireless device responds to the first wireless device, a second query to a profile server may be required to determine addressing information associated with the first wireless device. This querying of the profile server is often redundant and unnecessary as devices may quickly respond to one another, following the same communication path for each of the messages.

In some examples, message systems may provide originating system information within the internet protocol (IP) payload that is carrying the message between the wireless devices. This originating system information may include source communication path or addressing information for the first device, including an identifier for the first device, a network gateway associated with the first device, a messaging system identifier for the first device, or any other similar information. However, although the information allows the second messaging system to identify the source of each of the messages, the information may fail to provide a desired communication path configuration between the first and second wireless devices.

Overview

Examples herein provide enhancements for providing communication path preferences in a communication message. In one implementation, a method of transferring a communication message includes identifying a communication message from a first wireless communication device to a second wireless communication device, and identifying a contact identifier for the second wireless communication device. The method further provides transferring a request to a profile server for connection information related to the contact identifier and receiving the connection information from the profile server, wherein the connection information comprises a device and network address for the second wireless communication device. The method also includes identifying a reply communication path for the second wireless communication device to the first wireless communication device, determining a quality of service associated with the communication message based on the connection information, and determining a time to live value associated with the quality of service, wherein the time to live value defines a period of time the reply communication path is valid for a reply message from the second wireless communication device to the first wireless communication device. The method also provides generating a modified communication message, the modified communication message comprising the time to live value and the communication message, and transferring the modified communication message for delivery to the second wireless communication device.

DETAILED DESCRIPTION

Figure 1:
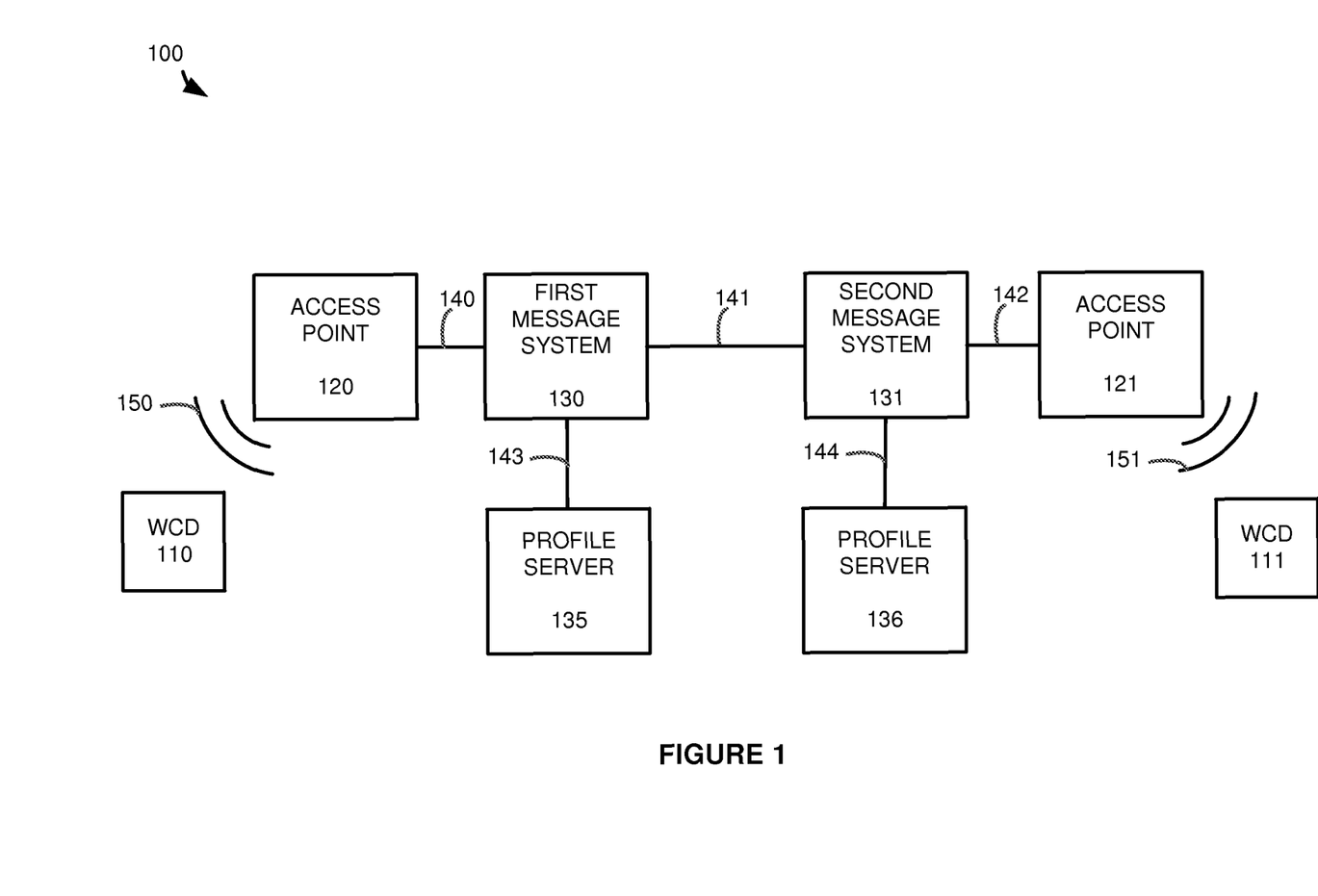
FIG. 1 illustrates a communication system to transfer communication messages between wireless communication devices.

FIG. 1 illustrates a communication system 100 to transfer communication messages between wireless communication devices. Communication system 100 includes wireless communication devices (WCDs) 110-111, access points 120-121, first message system 130, second message system 131, and profile servers 135-136. Access point 120 provides wireless communication signaling 150 to WCD 110, and access point 121 provides wireless communication signaling 151 to WCD 111. First message system 130 communicates with access point 120 via communication link 140, profile server 135 via communication link 143, and second message system 131 via communication link 141. Second message system communicates with profile server 136 via communication link 144, and access point 121 via communication link 142.

WCDs 110-111 may each comprise a mobile phone, smartphone, tablet, or any other similar communication device capable of transferring communication messages to other devices over a wireless network. These communication messages may include short message service (SMS) messages, multimedia messaging service (MMS) messages, and the like.

In operation, to transfer a message, WCD 110 uses access point 120 to forward the message to first message system 130. Access point 120 may comprise an eNodeB, a femtocell, a third generation wireless base station, or any other similar access point capable of providing wireless services to WCD 110. First message system 130 may comprise an internet protocol multimedia subsystem (IMS), an IP short message gateway, or any other similar system capable of providing messaging capabilities to WCD 110. In response to receiving the message from WCD 110, first message system 130 determines communication path information for the message to direct the message to WCD 111. To provide this operation, first message system 130 queries profile server 135 to determine addressing information for WCD 111. Once queried, and the identity of second message system 131 is determined for WCD 111, first message system initiates a transfer of the message over second message system 131 and access point 121 to WCD 111.

Here, in addition to the media contents of the message provided by WCD 110, first message system 130 is further configured to determine a quality of service associated with the message. This quality of service, which is determined, at least in part, by the information provided by profile server 130, permits first message system 130 to specify response message parameters for WCD 111. These parameters may include communication path information for return messages to WCD 110, time to live (TTL) information for the communication path between WCD 110 and WCD 111, or any other similar information to organize the response of messages from WCD 111 to WCD 110. In some implementations, the quality of service may be determined based on profile information stored for WCD 110, may be determined based on profile information stored for WCD 111, may be determined based on the current wireless access format being used by the two devices, or may be determined in any other similar manner. For example, if WCD 110 were sending a high definition image, information provided by profile server 135 may be used to determine a quality of service for reply communications between WCD 110 and WCD 111.

Figure 2:
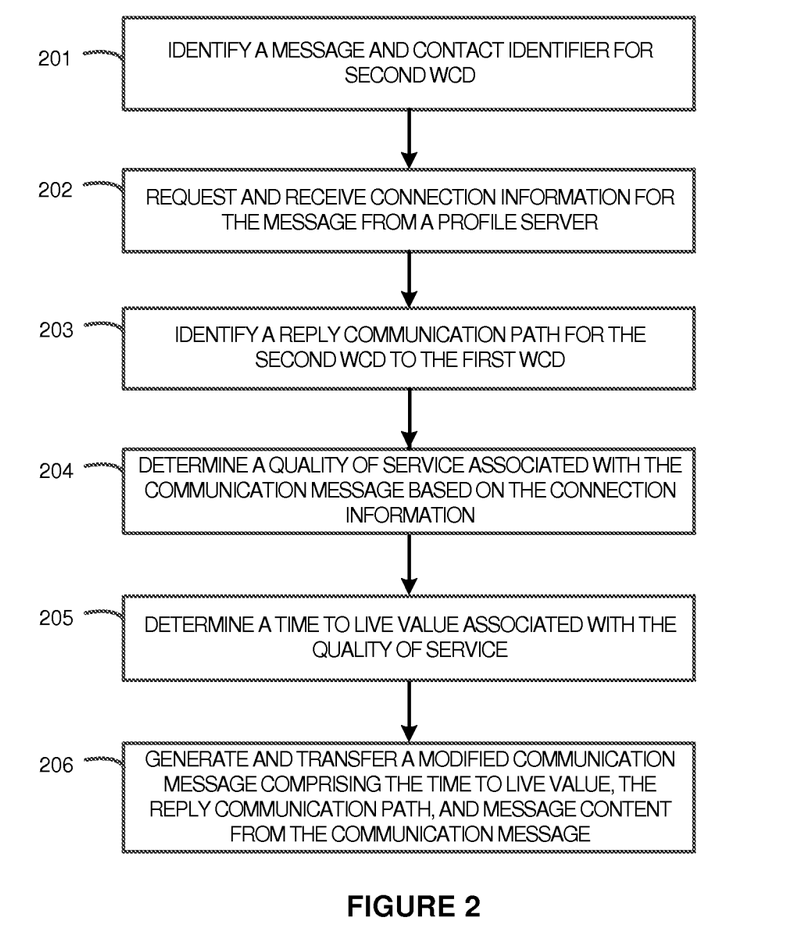
FIG. 2 illustrates a method of operating a messaging system to transfer communication messages between wireless communication devices.

To further demonstrate the operations in communication system 100, FIG. 2 is provided. FIG. 2 illustrates a method of operating a messaging system to transfer communication messages between wireless communication devices. The operations of FIG. 2 are referenced parenthetically in the description below.

As described in FIG. 1, WCD 110 may include processes capable of wirelessly transferring communication messages, such as SMS messages, to other wireless devices. As a message is transferred from WCD 110, access point 120 receives the communication and forwards the communication across the wireless network to first message system 130. First message system 130 receives or identifies the communication message from first WCD 110 to WCD 111, and identifies a contact identifier for WCD 111 (201). This contact identifier may include a phone number associated with WCD 111, an email address associated with WCD 111, or any other similar identifier associated with WCD 111. In response to identifying the message from WCD 110, first message system 130 requests and receives connection information for the message from profile server 135 (202). Profile server 135, which may comprise a HSS or some other similar subscriber server, operates as a database listing information for available wireless devices. This information may include addressing information for WCD 111, addressing information for the messaging system associated with the WCD 111, quality of service information associated with WCD 110, quality of service information associated with WCD 111, quality of service information about the wireless network corresponding to WCD 110 or WCD 111, quality of service information about the type of data being transferred in the message, or any other similar information. In some implementations, the quality of service information for the communication message may include a numerical, letter, or some other similar grade for quality of service in one or more of the aforementioned quality of service categories.

Once the connection information is obtained by first message system 130, first message system 130 identifies a reply communication path for the second WCD 111 to the first WCD 110 (203). In some instances, the reply communication path may be identical to the communication path from WCD 110 to WCD 111. As illustrated in FIG. 1, this path would include first message system 130 and second message system 131 to handle any reply communications from WCD 111 to WCD 110. In other implementations, rather than using the same path that was used for the transfer of the initial message, first message system 130 may identify an alternative message system or communication path to handle the reply messages between WCD 111 and WCD 110. This alternative path may be based on the connection information gathered from profile server 135. For example, profile server 135 may identify that WCD 110 transferred a high definition photo, and redirect future communications between the two devices to an alternative messaging system, separate from first message system 130, which better manages high definition photo exchanges. This alternative messaging system may be more capable of processing large uncompressed images, may be a system that is exclusively used for the images, or any other system deemed a better solution for the images.

In addition to identifying the communication path for replies, the method further provides determining a quality of service associated with the communication message based on the connection information (204). As described previously, profile server 135 may provide various information to first message system 130 about the devices involved in the message communication, the content included in the communication, and the networks that provide the communication capability. Based on the information that is gathered for the particular communication, a quality of service can be determined to manage future communications between the devices. The quality of service may be generated based on a particular category of information from profile server 135, may be determined based on an algorithm applied to the data from profile server 135, or may be determined in any other similar manner.

Once the quality of service is determined, the method further includes determining a time to live value associated with the quality of service (205). This time to live value is associated with the identified reply path, allowing WCD 111 to reply using the identified reply path for a particular period. For example, if first message system 130 identified a reply path that included first message system 130 and second message system 131, then any reply from WCD 111 within the time to live value would be permitted to pass through message systems 130-131 to support the communication. In contrast, if a reply for WCD 111 occurred outside of the given time period determined by the quality of service, then second message system 131 might be required to query profile server 136 to determine a new path to WCD 110.

Once the reply path and time to live value are identified for the communication, first message system 130 generates a modified communication message comprising the original message content from the communication message, the time to live value, and the reply message path, and transfers the modified communication message for delivery to WCD 111 (206). This modified message, which may be generated by modifying the IP payload of the original message, may be used by second message system 131 to determine characteristics or preferences by first message system 130 for WCD 110. For example, if reply communications should be directed to a third message system, second message system 131 may identify the information from the modified communication message and communicate replies from WCD 111 to the third message system for delivery to WCD 110. Further, second message system 131 may use the time to live information included in the modified message to determine when to dip or query profile server 136 for information on WCD 110. For example, if WCD 111 transferred a response message within the specified time to live, then second message system 131 may transfer the response using the communication path specified by first message system 130. In contrast, if the communication were transferred outside of the time to live, then second message system 131 may be forced to query profile server 136 for information regarding WCD 110.

In some implementations, second message system 131 may include similar functionalities as first message system 130. These functionalities may include the ability to identify communication preferences for WCD 111, and communicate the preferences to first message system 130. Once communicated, first message system 130 may use the preferences to identify the appropriate communication path back to WCD 111. Although illustrated separate in the present example, it should be understood that WCD 110 and WCD 111 may share a message system in some implementations.

Figure 3:
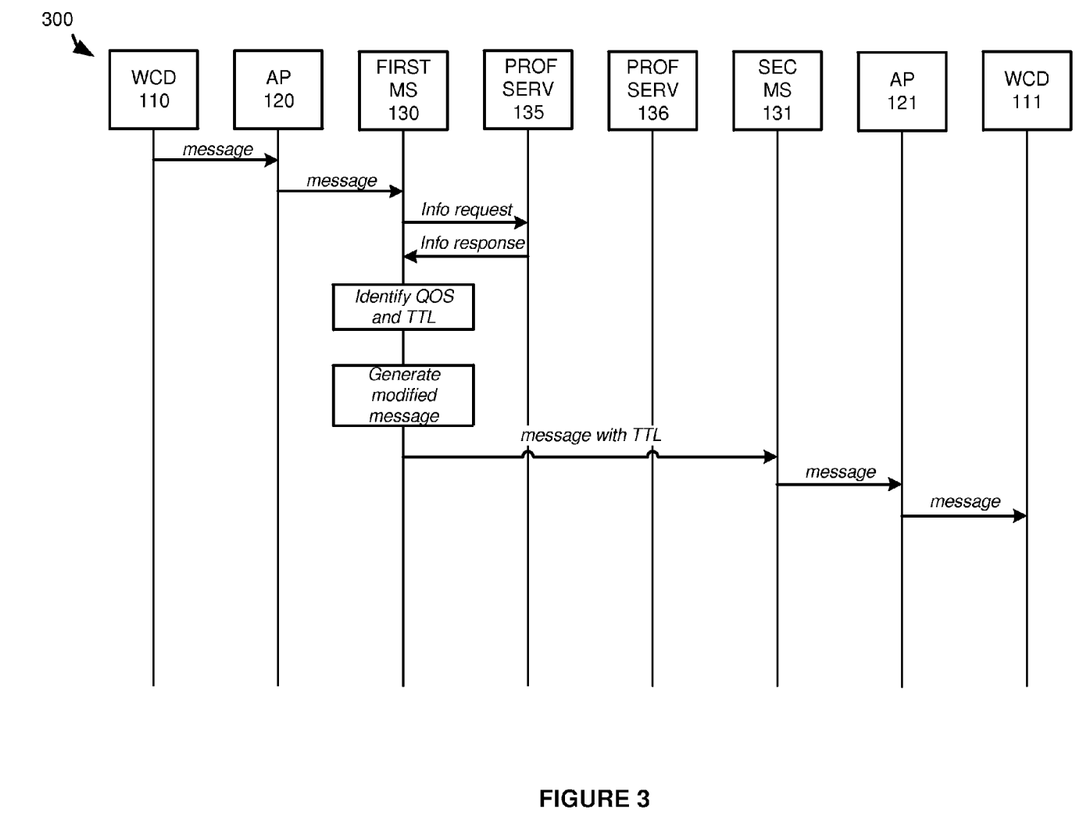
FIG. 3 illustrates a timing diagram of transferring a communication message between wireless communication devices.

FIG. 3 illustrates a timing diagram 300 of transferring a communication message between wireless communication devices. Timing diagram 300 includes the systems and elements defined in communication system 100 of FIG. 1.

As depicted in FIG. 3, WCD 110 initiates a transfer of a communication message to WCD 111. This communication message, which may comprise a SMS message, a MMS message, or the like, is transferred over access point 120 to first message system 130. The message may include various content, including text, images, videos, and the like. First message system 130 receives the message and identifies communication preferences for the message before continuing the communication of the message to WCD 111. In the present example, first message system 130 transfers an information request to profile server 135, requesting information regarding WCD 111. This information may include an address for WCD 111, a messaging service associated with WCD 111, a quality of service associated with WCD 111, or any other similar information about WCD 111. In addition to the information about WCD 111, profile server 135 may also provide information about WCD 110, including the quality of service associated with WCD 110, the types of special services to be provided to WCD 110, any special networks associated with WCD 110, or any other similar information. Once the request is received and the information is determined, profile server 135 transfers an information response to first message system 130 containing the desired information.

In response to receiving the information, first message service 130 identifies a quality of service associated with the message, and determines a time to live for a reply communication path between WCD 111 and WCD 110. To determine the communication path, first message system 130 may use the information provided by profile server 135. For example, profile server 135 may identify a preferred message system, separate from first message system 130, which should handle future communications between WCD 111 and WCD 110. Once the preferred message system is identified, first message system 130 may use the message system for future communication paths between the devices. In other implementations, rather than using the information from profile server 135, first message system 130 may identify itself as the message system associated with the communication path for WCD 110. In addition to the communication path, first message system 130 further determines a time to live for the identified communication path based on the quality of service, which may be provided by profile server 135, determined using the information from profile server 135 and a calculating algorithm, or determined in any other similar manner.

Once the time to live and the communication path information is determined for the reply messages, first message system 130 generates a modified communication message that can be forwarded to the second message system associated with WCD 111. This modified communication message includes the time to live information for replies to the initial communication, as well as the content of the original message from WCD 110. Further, in some implementations, particularly in the example of the preferred message system for WCD 110, the the modified message may include addressing information for reply messages over the preferred messaging service. After generating the modified communication message, first message system 130 transfers the modified message to WCD 111 using the addressing information provided by profile server 135. Here, the addressing information directs the message to WCD 111 over second message system 131, which forwards the message over access point 121 to WCD 111. In some implementations, the addressing information for second message system 131 may include information about the border gateway router supporting the messaging system, an address for the device with the messaging system, or any other similar information. Once the message is received, second message system 131 may use the modified message to determine how responses should be directed to WCD 110.

Figure 4:
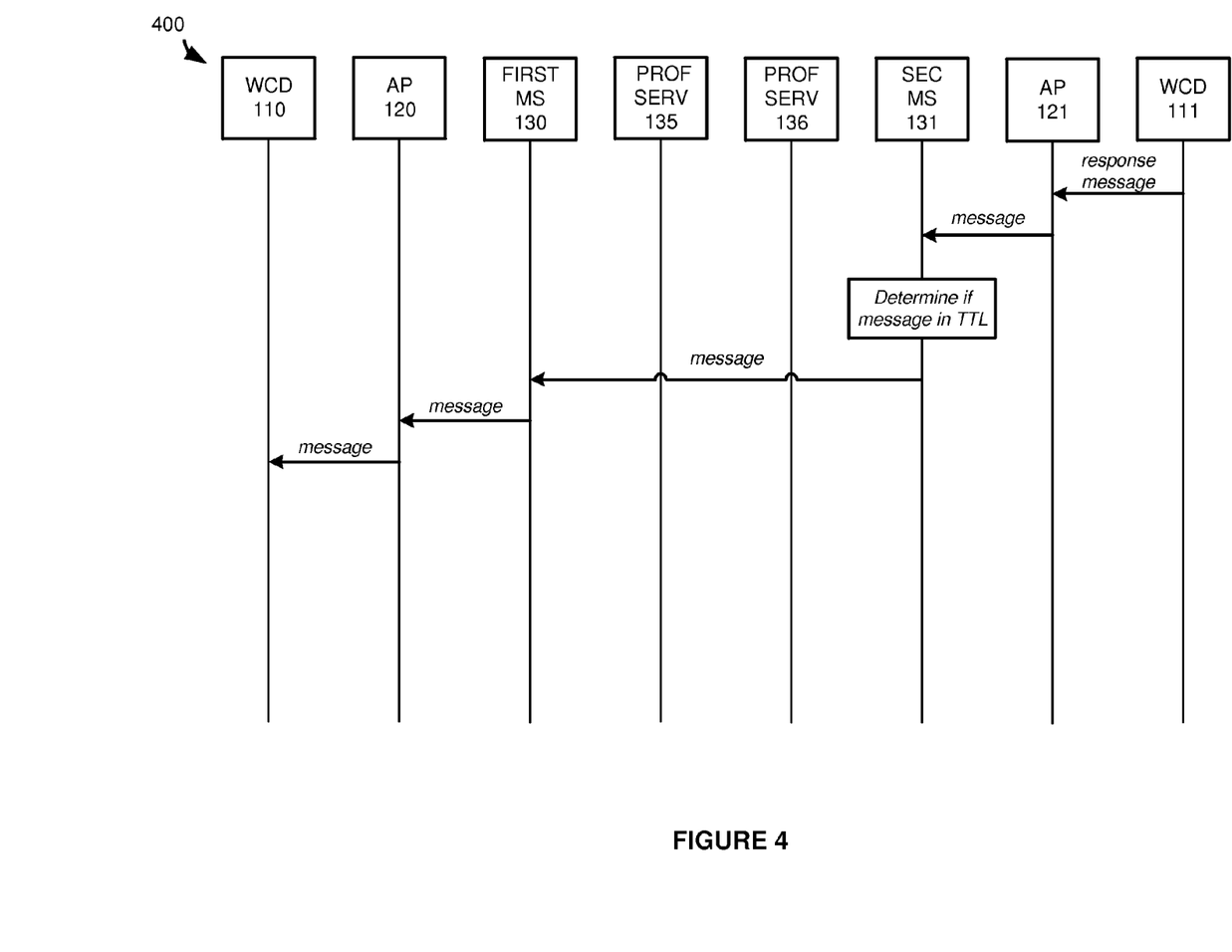
FIG. 4 illustrates a timing diagram of transferring a response message from a wireless communication device to another wireless communication device.

FIG. 4 illustrates a timing diagram 400 of transferring a response message from a wireless communication device to another wireless communication device. Timing diagram 400 includes the systems and elements defined in communication system 100 of FIG. 1. FIG. 4 is an example of transferring a response message from WCD 111 to WCD 110.

As illustrated in FIG. 3, WCD 110 transfers a message across first message system 130 and second message system 131 to WCD 111. During the transfer, first message system 130 incorporates transfer information for future reply messages to WCD 110, which may include information about the communication path to WCD 110, information about how long a path is available to WCD 110 without querying a profile server for communication path information, or any other similar path information for WCD 111. In the present example, WCD 111 initiates a response message to WCD 111, and transfers the message across access point 121 to second message system 131. Once the message is received by second message system 131, second message system 131 determines if the message was transferred within the time to live supplied by first message system 130 for the first communication. For example, during the first message communication, first message system 130 may identify a time to live of ten minutes to support the current communication path between WCD 110 and WCD 111. Accordingly, when the response message is received from WCD 111, second message system 131 may determine whether the response occurred within ten minutes of the originally identified message.

Here, second message system 131 determines that the response message of WCD 111 occurred during the period provided by first message system 130. Once the determination is made, second message system 131 provides the message across the defined communication path for WCD 110. In the present example, the defined path for WCD 110 includes transferring over first message system 130 and access point 120, however, it should be understood that in the original message from first message system 130, first message system 130 may have specified an alternative communication path or message system to process the exchange of messages between WCD 110 and WCD 111. For example, if WCD 110 were communicating high definition movies, it may be desirable to have the communications between WCD 110 and WCD 111 transfer from a message system exclusive to high definition movies.

Figure 5:
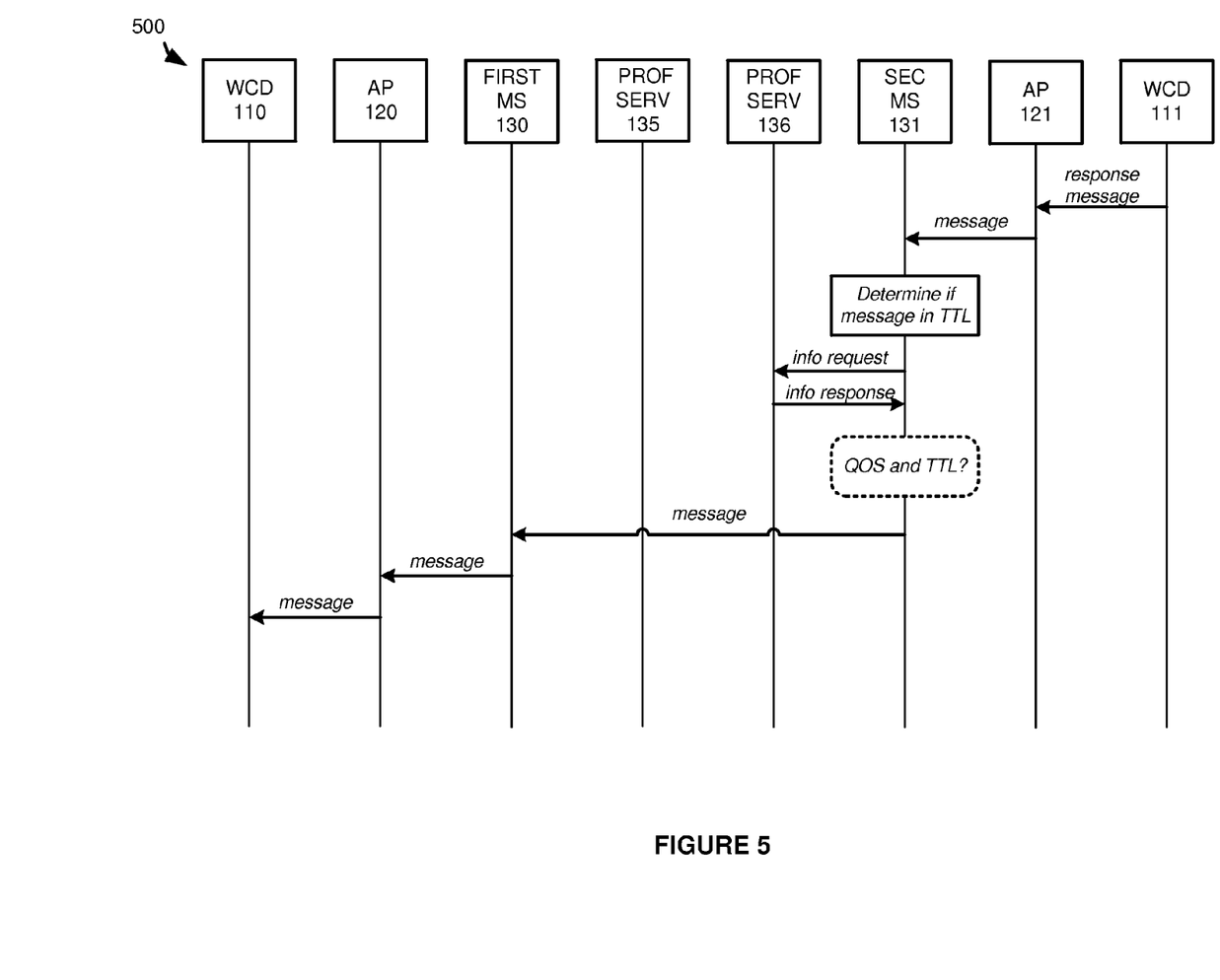
FIG. 5 illustrates a timing diagram of transferring a response message from a wireless communication device to another wireless communication device.

FIG. 5 illustrates a timing diagram 500 of transferring a response message from a wireless communication device to another wireless communication device. Timing diagram 500 includes the systems and elements defined in communication system 100 of FIG. 1. FIG. 5 is an example of transferring a response message from WCD 111 to WCD 110.

As illustrated in FIG. 3, WCD 110 transfers a message across first message system 130 and second message system 131 to WCD 111. During the transfer, first message system 130 incorporates transfer information for future reply messages to WCD 110, which may include information about the communication path to WCD 110, information about how long a path is available to WCD 110 without querying a profile server for communication path information, or any other similar path information for WCD 111. In the present example, WCD 111 initiates a response message to WCD 110, and transfers the message across access point 121 to second message system 131. In response to receiving the message, second message system 131 determines if the message transferred by WCD 111 occurs within the time to live parameters defined by first message system 130. In particular, second message system 131 may cache time to live and communication path information for the exchange between WCD 110 and WCD 111. If the message occurs within the specified time to live, then second message system 131 may use the path information cached from first message system 130. However, such as the example illustrated in timing diagram 500, when second message system 131 determines that a message falls outside of the specified time to live, second message system 131 may be required to query profile server 136 to determine communication path information to WCD 110. In some implementations, the information determined profile server 136 may include communication path information for WCD 110, including border gateways associated with the device, messaging systems associated with the device, or any other similar path information, and may further include quality of service information associated with WCD 110 and WCD 111. This quality of service information may be based on the devices included in the communication, the time of day that the communication is taking place, the type of information in the message communication, or any other similar quality of service information.

Once the information is supplied by profile server 136 to second message system 131, second message system 131 determines a time to live for reply communications to WCD 111 based on the quality of service information. For example, different devices may be provided with different qualities of service increasing or decreasing the time to live for a communication path between devices. After determining the time to live, second message system 131 generates a modified communication message using the content for the original response message and the time to live derived from profile server 136, and transfers the modified communication message to WCD 110 using access point 120 and first message system 130. The time to live and communication path information provided by second message system 131 may then be used in any responses from WCD 110 to determine the route of the response to WCD 111 without querying profile server 135.

Although the response message in the present implementation uses first message system 130, it should be understood that profile server 136 might identify alternative message systems and communication paths based on the involved devices, the type of content or data in the communication, or the like.

Figure 6:
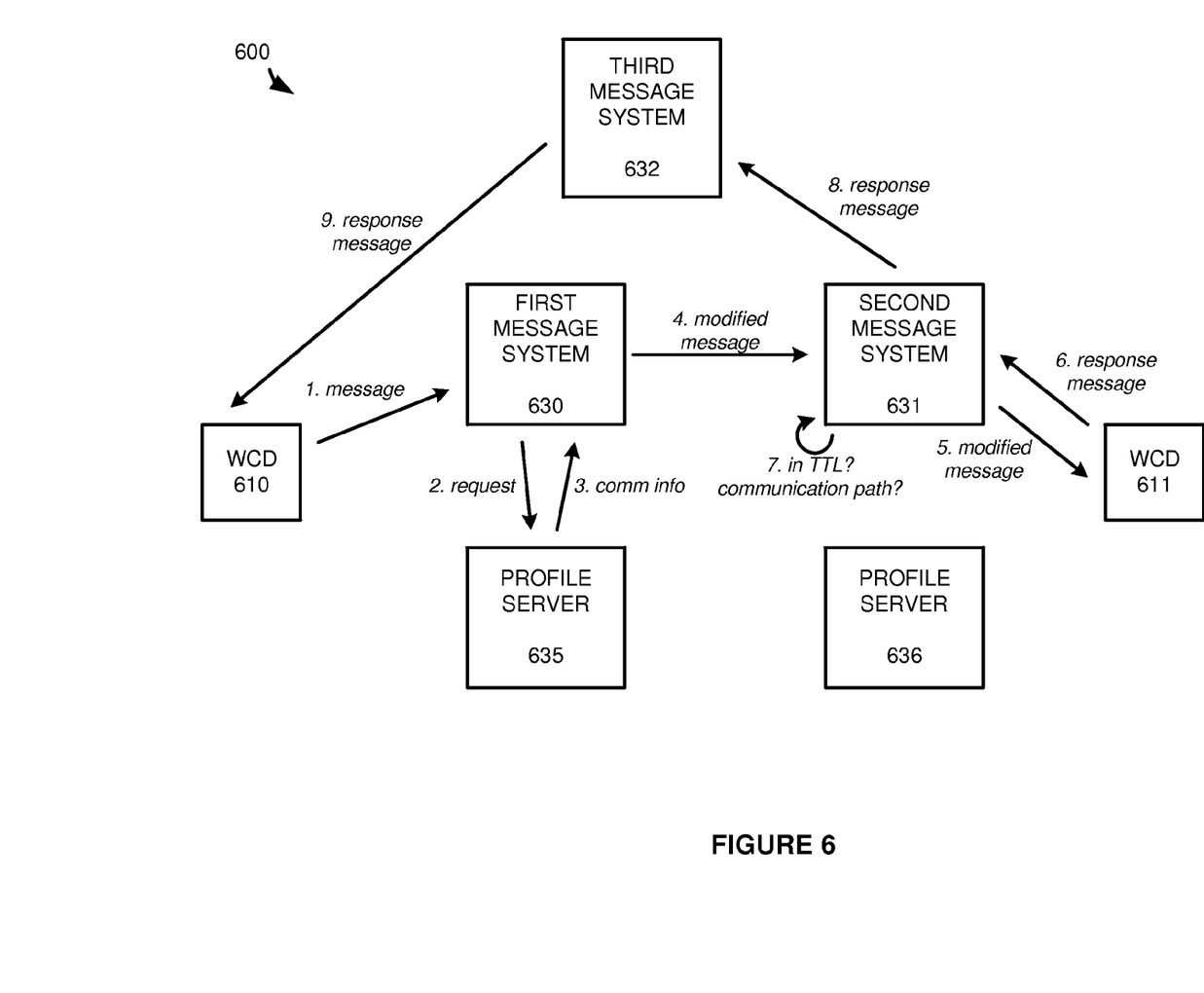
FIG. 6 illustrates an operational scenario of directing a response message to an alternative messaging system.

FIG. 6 illustrates an operational scenario 600 of directing a response message to an alternative messaging system. Operational scenario 600 includes WCDs 610-611, first message system 630, second message system 631, third message system 632, and profile servers 635-636. Although not illustrated in the present example for clarity, it should be understood that WCD 610-611 communicate with message systems 630-632 using wireless access points that provide wireless communication services to the devices.

As depicted, WCD 610 transfers a message across the wireless network to first message system 630. First message system 630 may comprise a message system in IMS or any other similar message system capable of transferring SMS, MMS, and other similar messages to wireless devices. In response to receiving the initial message from WCD 610, message system 630 request communication information from profile server 635. This communication information may include communication path information related to contacting WCD 611, communication path information for any reply communications to WCD 610, quality of service information associated with WCD 610 and 611, or any other similar information. The quality of service information may include any information capable of modifying a time to live value associated with response messages from WCD 611. In particular, the time to live value may specify a period for which reply messages may be transferred from WCD 611 across second message system 631 without re-querying a profile server for communication path information. Thus, when communications are quickly sent between the devices, each of the messaging systems are not required to communicate with a profile server to deliver each message.

Once the communication information is retrieved from profile server 635, first message system 630 generates a modified communication message that adds communication preferences to the original message. These preferences include the time to live associated with a desired future communication path and the preferred communication path for reply communications between WCD 611 and WCD 610. Here, the preferred reply communication path directs second message system 631 to transfer future reply communications to third message system 632. In some implementations, third message system 632 may be a message system dedicated to a particular type of media, such as video or images, may be a message system dedicated to devices with a particular quality of service level, or may be any other desirable message system capable of providing message communication services to WCD 610.

As the modified message is transferred to WCD 611, second message system 631 may extract the communication preferences included in the message and use the preferences to manage any future replies between WCD 611 and WCD 610. As illustrated in the example of FIG. 6, WCD 611 transfers a response message that is identified by second message system 611. In response to the response message, second message system 631 uses the communication preferences provided in the message from first message system 630 to determine a communication path for response message. This identification of the communication path may include identifying if the reply occurred within the specified time to live, and identifying the preferred communication path for WCD 610. Once it is determined that the response message occurred within the time to live, as illustrated in operational scenario 600, second message system 631 may forward the communication across third message system 632 to WCD 610.

Figure 7:
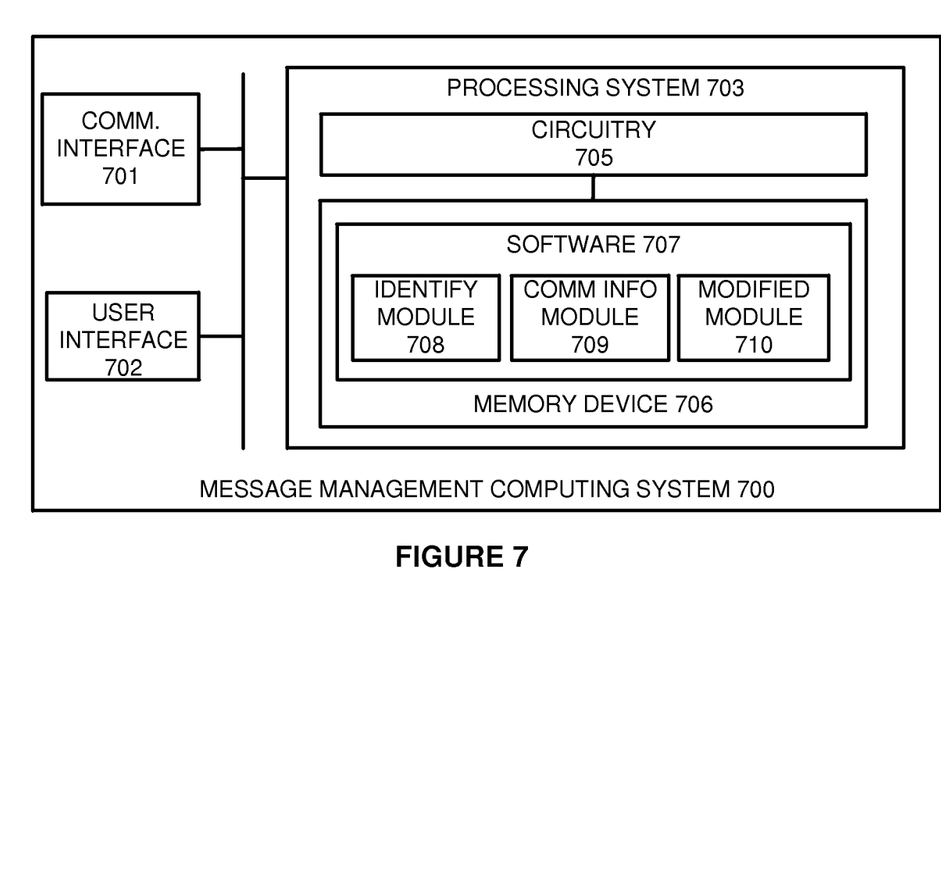
FIG. 7 illustrates a message management computing system to transfer communication message information based on quality of service.

FIG. 7 illustrates a message management computing system 700 to transfer communication message information based on quality of service. Message management computing system 700 is representative of any computing system or systems with which the various operational architectures, processes, scenarios, and sequences disclosed herein for a message system may be implemented. Message management system 700 is an example of message systems 130-131 or message systems 730-732, although other examples may exist. Message management computing system 700 comprises communication interface 701, user interface 702, and processing system 703. Processing system 703 is linked to communication interface 701 and user interface 702. Processing system 703 includes processing circuitry 705 and memory device 706 that stores operating software 707. Message management computing system 700 may include other well-known components such as a battery and enclosure that are not shown for clarity. Computing system 700 may be a personal computer, server, or some other computing apparatus—including combinations thereof.

Communication interface 701 comprises components that communicate over communication links, such as network cards, ports, radio frequency (RF) transceivers, processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In particular, communication interface 701 may be configured to communicate with wireless network gateways and/or routers to identify communication messages from wireless communication devices, and forward the communications to destination messaging systems.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes identify module 708, communication information (comm info) module 709, and modified module 710, although any number of software modules may provide the same operation. Operating software 707 may further include an operating system, utilities, drivers, network interfaces, applications, or some other type of software. When executed by processing circuitry 705, operating software 707 directs processing system 703 to operate message management computing system 700 as described herein.

In particular, identify module 708 directs processing system 703 to identify a message from a first wireless communication device to a second wireless communication device, wherein the message may comprise a SMS message, a MMS message, or some other similar type message. In addition to identifying the message, identify module 708 further directs processing system 703 to identify an identifier for the second wireless communication device, which may comprise a phone number, an extension number, a username, or some other similar identifier. Once the identifier is determined for the second device, communication information module 709 directs processing system 703 to transfer a request for communication information to a profile server. This profile server, which may include a HSS or some other similar profile server, stores a variety of information about the communicating devices. The communication information may include addressing information for the second device including the corresponding gateway or message system associated with the second device, quality of service information associated with the first device, quality of service information associated with the second device, or any other similar communication information.

In response to the request, the profile server identifies the required information and transfers the information to computing system 700. Once received, communication information module 709 may use the information to determine an appropriate communication path for the transfer from the first wireless device to the second wireless device, and further determine a quality of service for the communication. This quality of service may dictate the amount of time that a reply communication path is available, the message system that should be responsible for the reply messages, or any other similar determination based on the quality of service. For example, a quality of service for a high definition picture message between the first device and the second device may dictate that a particular message system is to handle the replies for the first device so long as a reply is sent within a particular time period. Once the reply path information is determined with time to live information, modified module 710 directs processing system 703 to generate a modified communication message that can be transferred to the second WCD and corresponding messaging system. The modified communication message may include the data from the original message of the first wireless device, the reply path information to communicate with the first wireless device, the time to live that the reply path is valid to the first device, or any other similar information.

After generating the modified message, message management computing system 700 may transfer the modified message for delivery to the second wireless device. In some implementations, to transfer the modified message, the message may be delivered to a second messaging management system responsible for the second device. This second messaging system may extract the reply communication preferences from the modified message and use them for future communications between the second wireless device and the first wireless device. For example, if a reply message was transferred from the second wireless device, the second message management system may determine if the response was transferred within the time to live period and, if it were transferred in the time to live, use the reply communication path specified within the modified message. However, if the reply message does not occur within the time to live, the second message management system may be required to query a profile server to determine a new communication path to the first wireless device.

Returning to the elements of FIG. 1, WCDs 110-111 each comprise Radio Frequency (RF) communication circuitry and an antenna. The RF communication circuitry typically includes an amplifier, filter, modulator, and signal processing circuitry. WCDs 110-111 may also each include a user interface, memory device, software, processing circuitry, or some other communication components. WCDs 110-111 may each comprise a telephone, computer, e-book, mobile Internet appliance, wireless network interface card, media player, game console, or some other wireless communication apparatus.

Wireless access points 120-121 comprise RF communication circuitry and at least one antenna to provide wireless communication services to WCDs 110-111. The RF communication circuitry typically includes an amplifier, filter, RF modulator, and signal processing circuitry. Wireless access points 120-121 may comprise a router, server, memory device, software, processing circuitry, cabling, power supply, network communication interface, structural support, or some other communication apparatus.

Message systems 130-131 and profile servers 135-136 may comprise one or more computing systems capable of managing messages and profile data for wireless communication devices. Message systems 130-131 and profile servers 135-136 may include processing systems, storage systems, communication interfaces, user interfaces, and other similar computing systems. Message systems 130-131 and profile servers 135-136 may each comprise one or more server computers, desktop computers, or other similar computing systems capable of supporting the operations described herein.

Wireless signaling 150-151 includes wireless links that use the air or space as transport media, and communicate with WCD 110 using Long Term Evolution (LTE), Code Division Multiple Access (CDMA), Global System for Mobile Communications (GSM), Evolution Data Optimized, or some other wireless communication format. Communication links 140-144 could use various communication protocols, such as Time Division Multiplex (TDM), Internet Protocol (IP), Ethernet, communication signaling, wireless communication signaling, or some other communication format—including combinations thereof. Communication links 140-144 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of transferring a communication message from a first wireless communication device to a second wireless communication device, the method comprising:
   identifying the communication message from the first wireless communication device to the second wireless communication device;
   identifying a contact identifier for the second wireless communication device;
   transferring a request to a profile server for connection information related to the contact identifier, wherein the connection information comprises a device and network address for the second wireless communication device;
   receiving the connection information from the profile server;
   identifying a reply communication path for the second wireless communication device to the first wireless communication device;
   determining a quality of service associated with the communication message based on the connection information;
   determining a time to live value associated with the quality of service, wherein the time to live value defines a period of time the reply communication path is valid for a reply message from the second wireless communication device to the first wireless communication device;
   generating a modified communication message, the modified communication message comprising the time to live value and message content from the communication message;
   transferring the modified communication message for delivery to the second wireless communication device.

2. The method of claim 1 wherein the communication message comprises a short message service (SMS) message.

3. The method of claim 1 wherein the connection information comprises device quality of service information associated with the first wireless communication device, and wherein determining the quality of service associated with the communication message based on the connection information comprises determining the quality of service associated with the communication message based on the device quality of service information associated with the first wireless communication device.

4. The method of claim 1 wherein the connection information comprises device quality of service information associated with the second wireless communication device, and wherein determining the quality of service associated with the communication message based on the connection information comprises determining the quality of service associated with the communication message based on the device quality of service information associated with the second wireless communication device.

5. The method of claim 1 wherein the connection information comprises network quality of service information associated with a network for the first wireless communication device or a network for the second wireless communication device, and wherein determining the quality of service associated with the communication message based on the connection information comprises determining the quality of service associated with the communication message based on the network quality of service.

6. The method of claim 1 wherein the connection information comprises data type information corresponding to data included in the communication message, and wherein identifying the reply communication path for the second wireless communication device to the first wireless communication device comprises determining the reply communication path for the second wireless communication device to the first wireless communication device based on the data type information.

7. The method of claim 1 further comprising identifying a device and network address for the first wireless communication device and wherein determining the reply communication path for the second wireless communication device and the first wireless communication device comprises determining the reply communication path for the second wireless communication device and the first wireless communication device based on the device and network address for the first wireless communication device.

8. The method of claim 7 wherein identifying the device and network address for the first wireless communication device comprises identifying a preferred messaging system to process messages for the first wireless communication device.

9. The method of claim 1 wherein the modified communication message further comprises the reply communication path.

10. An apparatus to transfer a communication message from a first wireless communication device to a second wireless communication device, the apparatus comprising:
a processing system;
one or more non-transitory computer readable media; and
processing instructions stored on the one or more non-transitory computer readable media that, when executed by the processing system, direct the processing system to:
identify the communication message from the first wireless communication device to the second wireless communication device;
identify a contact identifier for the second wireless communication device;
transfer a request to a profile server for connection information related to the contact identifier, wherein the connection information comprises a device and network address for the second wireless communication device;
receive the connection information from the profile server;
identify a reply communication path for the second wireless communication device to the first wireless communication device;
determine a quality of service associated with the communication message based on the connection information;
determine a time to live value associated with the quality of service, wherein the time to live value defines a period of time the reply communication path is valid for a reply message from the second wireless communication device to the first wireless communication device;
generate a modified communication message, the modified communication message comprising the time to live value and message content from the communication message;
transfer the modified communication message for delivery to the second wireless communication device.

11. The apparatus of claim 10 wherein the communication message comprises a short message service (SMS) message.

12. The apparatus of claim 10 wherein the connection information comprises device quality of service information associated with the first wireless communication device, and wherein the processing instructions to determine the quality of service associated with the communication message based on the connection information direct the processing system to determine the quality of service associated with the communication message based on the device quality of service information associated with the first wireless communication device.

13. The apparatus of claim 10 wherein the connection information comprises device quality of service information associated with the second wireless communication device, and wherein the processing instructions to determine the quality of service associated with the communication message based on the connection information direct the processing system to determine the quality of service associated with the communication message based on the device quality of service information associated with the second wireless communication device.

14. The apparatus of claim 10 wherein the connection information comprises network quality of service information associated with a network for the first wireless communication device or a network for the second wireless communication device, and wherein the processing instructions to determine the quality of service associated with the communication message based on the connection information direct the processing system to determine the quality of service associated with the communication message based on the network quality of service.

15. The apparatus of claim 10 wherein the connection information comprises data type information corresponding to data included in the communication message, and wherein the processing instructions to identify the reply communication path for the second wireless communication device to the first wireless communication device direct the processing system to determine the reply communication path for the second wireless communication device to the first wireless communication based on the data type information.

16. The apparatus of claim 10 wherein the processing instructions further direct the processing system to identify a device and network address for the first wireless communication device, and wherein the processing instructions to determine the reply communication path for the second wireless communication device and the first wireless communication device direct the processing system to determine the reply communication path for the second wireless communication device and the first wireless communication device based on the device and network address for the first wireless communication device.

17. The apparatus of claim 16 wherein the processing instructions to identify the device and network address for the first wireless communication device comprises identifying a preferred messaging system to process messages for the first wireless communication device.

18. The apparatus of claim 10 wherein the modified communication message further comprises the reply communication path.

19. A method of transferring a short message service (SMS) message between a first wireless communication device and a second wireless communication device, the method comprising:
identifying the SMS message from the first wireless communication device to the second wireless communication device, wherein the second wireless communication device is associated with a contact identifier;
transferring a request to a profile server for connection information related to the contact identifier, wherein the connection information comprises a device and network address for the second wireless communication device and quality of service information related to the SMS message;
receiving the connection information from the profile server;
identifying a reply communication path based on the connection information;
determining a time to live value based on the connection information, wherein the time to live value defines a period of time the reply communication path is valid for a reply message from the second wireless communication device to the first wireless communication device;
generating a modified SMS message, wherein the modified SMS message comprises content from the SMS message, the reply communication path, and the time to live value; and
transferring the modified communication message for delivery to the second wireless communication device.

20. The method of claim 19 wherein the contact identifier comprises one of a telephone number or username associated with the second wireless communication device.

* * * * *